United States Patent
Lagardere et al.

(10) Patent No.: US 9,762,860 B2
(45) Date of Patent: Sep. 12, 2017

(54) METHOD OF DISPLAY OF A USER INTERFACE AND CORRESPONDING TRANSMISSION METHOD

(75) Inventors: Jean-Francois Lagardere, Rennes (FR); Renaud Rigal, Cesson Sevigne (FR); Aurelien Longet, Rennes (FR); Thierry Quere, Monfort sur Meu (FR)

(73) Assignee: Thomson Licensing DTV, Issy-les-Moulineaux (FR)

(*) Notice: Subject to any disclaimer, the term of this patent is extended or adjusted under 35 U.S.C. 154(b) by 469 days.

(21) Appl. No.: 12/459,350

(22) Filed: Jun. 30, 2009

(65) Prior Publication Data
US 2009/0327959 A1    Dec. 31, 2009

(30) Foreign Application Priority Data

Jun. 30, 2008 (FR) ..................... 08 54403

(51) Int. Cl.
*H04N 21/433* (2011.01)
*H04N 7/16* (2011.01)
(Continued)

(52) U.S. Cl.
CPC ....... *H04N 7/163* (2013.01); *H04N 21/23412* (2013.01); *H04N 21/4332* (2013.01);
(Continued)

(58) Field of Classification Search
CPC .... G06F 3/0482; G06F 3/0481; G06F 9/4443; G06F 3/04817; G06F 3/0489;
(Continued)

(56) References Cited

U.S. PATENT DOCUMENTS 6,487,722 B1 * 11/2002 Okura et al. ................... 725/40
6,559,871 B1    5/2003 Brozowski et al.
(Continued)

FOREIGN PATENT DOCUMENTS

CA    2 419 366 A1    8/2003
CN    1722218 A       1/2006
(Continued)

OTHER PUBLICATIONS

European Search Report dated Dec. 9, 2008.
(Continued)

*Primary Examiner* — Rinna Yi
(74) *Attorney, Agent, or Firm* — Myers Wolin, LLC

(57) ABSTRACT

The invention proposes a method of display of a user interface, that comprises the following steps: a step of display in foreground of a first user interface generated from stored display elements, comprising a first set of display elements providing access to first services, a reception step of a second set of display elements giving access to second services, and a display step of a second user interface in foreground, replacing the first user interface.
The invention also relates to a method of transmission of a set of display elements giving access to services, that comprises the following steps: a transmission step of a first set of display elements, giving access to services, and a transmission step of a second set of display elements, giving access to services, and destined to be stored.

12 Claims, 9 Drawing Sheets

Figure 1:
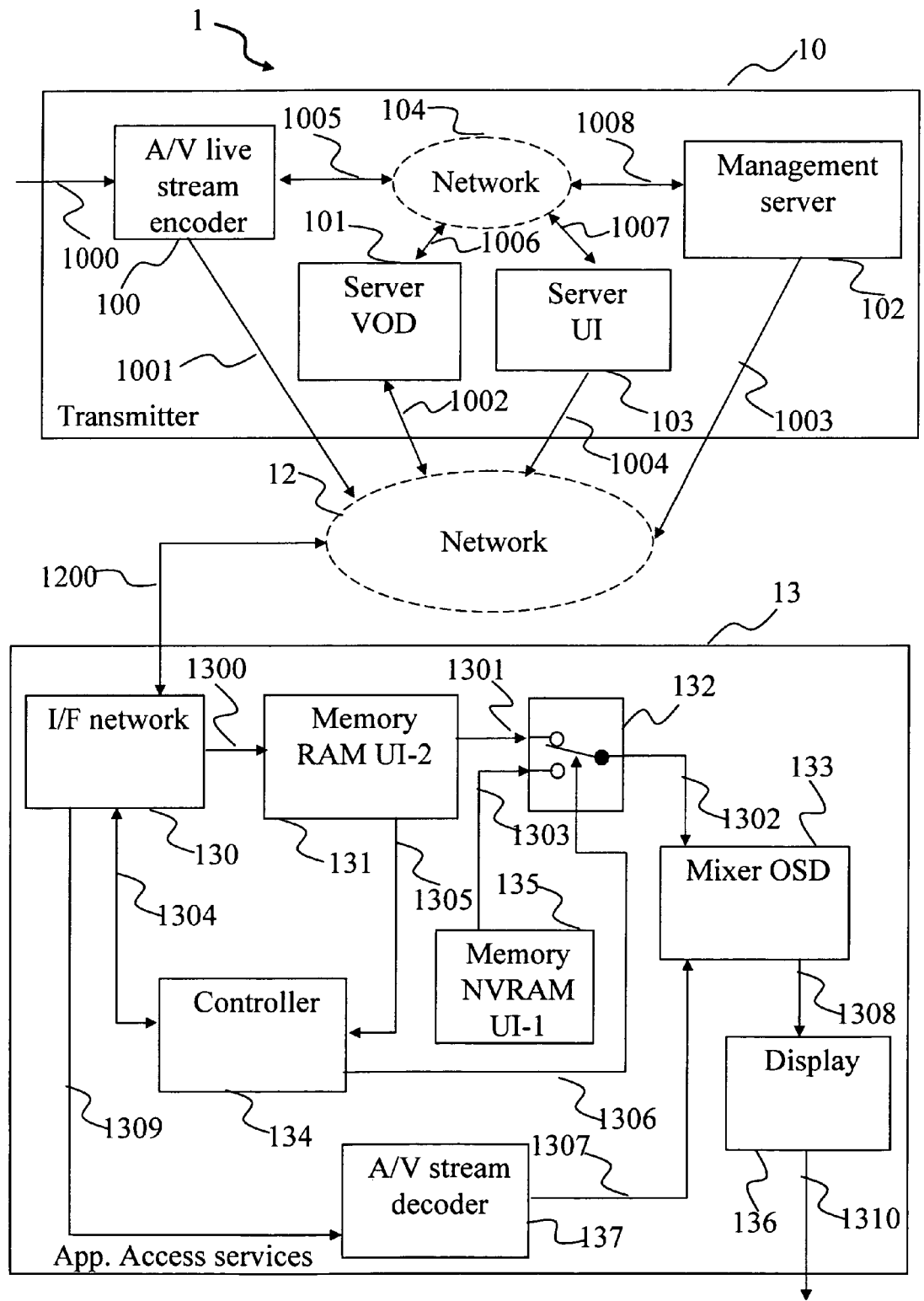

(51) Int. Cl.
*H04N 21/234* (2011.01)
*H04N 5/445* (2011.01)
*H04N 21/2187* (2011.01)
*H04N 21/443* (2011.01)

(52) U.S. Cl.
CPC ..... *H04N 5/44543* (2013.01); *H04N 21/2187* (2013.01); *H04N 21/4331* (2013.01); *H04N 21/4438* (2013.01)

(58) Field of Classification Search
CPC ............. H04N 5/44543; H04N 5/4401; H04N 21/4622; H04N 21/482; H04N 5/50; H04N 21/4316; H04N 21/84; H04N 21/4345; H04N 7/17318; H04N 21/47217; H04N 21/47202; H04N 21/42209; H04N 2005/441
USPC ...... 715/810, 825, 835; 725/109, 37, 38, 39, 725/40, 50, 61, 139
See application file for complete search history.

(56) References Cited

U.S. PATENT DOCUMENTS

| | | | |
|---|---|---|---|
| 6,604,242 B1 | 8/2003 | Weinstein et al. | |
| 6,782,550 B1* | 8/2004 | Cao | H04N 5/44543 348/E5.105 |
| 7,036,137 B1* | 4/2006 | Arsenault et al. | 725/38 |
| 7,254,824 B1 | 8/2007 | Gordon et al. | |
| 7,810,116 B2* | 10/2010 | Gordon et al. | 725/39 |
| 2001/0037507 A1* | 11/2001 | Mori | 725/97 |
| 2001/0051927 A1 | 12/2001 | London et al. | |
| 2002/0023002 A1 | 2/2002 | Staehelin | |
| 2002/0067376 A1* | 6/2002 | Martin et al. | 345/810 |
| 2003/0005446 A1* | 1/2003 | Jaff et al. | 725/51 |
| 2005/0034155 A1 | 2/2005 | Gordon et al. | |
| 2005/0044182 A1 | 2/2005 | Kotzin | |
| 2005/0071777 A1 | 3/2005 | Roessler et al. | |
| 2005/0155063 A1* | 7/2005 | Bayrakeri et al. | 725/47 |
| 2005/0204047 A1 | 9/2005 | Mitchell et al. | |
| 2005/0262500 A1 | 11/2005 | Stanley | |
| 2005/0278737 A1 | 12/2005 | Ma et al. | |
| 2006/0020969 A1 | 1/2006 | Utsuki et al. | |
| 2006/0294223 A1 | 12/2006 | Glasgow et al. | |
| 2007/0055991 A1* | 3/2007 | Choi et al. | 725/40 |
| 2007/0136749 A1* | 6/2007 | Hawkins | H04N 5/44543 725/38 |
| 2007/0204057 A1 | 8/2007 | Shaver et al. | |
| 2007/0245399 A1 | 10/2007 | Espelien | |
| 2009/0133063 A1* | 5/2009 | Sparrell | 725/40 |

FOREIGN PATENT DOCUMENTS

| | | |
|---|---|---|
| JP | 62-283789 A | 12/1987 |
| JP | 64-21622 A | 1/1989 |
| JP | 4098519 B2 | 3/1992 |
| JP | 11-45166 A | 2/1999 |
| JP | 2004-537879 A | 12/2004 |
| JP | 2002-521931 A | 9/2006 |
| JP | 2007-116382 A | 5/2007 |
| JP | 2007-124080 A | 5/2007 |
| KR | 2002-0011016 A | 2/2002 |
| KR | 20030034081 | 5/2003 |
| WO | 95/18439 A1 | 7/1995 |
| WO | 00/05891 A1 | 2/2000 |
| WO | 00/36836 A1 | 6/2000 |
| WO | 01/44988 A1 | 6/2001 |
| WO | WO0193060 | 12/2001 |
| WO | 02/082814 A2 | 10/2002 |

OTHER PUBLICATIONS

Advanced Television Systems Committee, Inc., "A/53: ATSC Digital Television Standard, Parts 1-6, 2007," Jan. 3, 2007, 1750 K Street, N.W., Suite 1200, Washington, D.C. 20006, pp. 1-136.

European Broadcasting Union, Final draft ETSI EN 300 744 V1.5.1 (2004-06); European Standard Telecommunications series), "Digital Video Broadcasting (DVB); Framing structure, channel coding and modulation for digital terrestrial television," European Telecommunication Standards Institute 2004, 650 Route des Lucioles, F-06921 Sophia Antipolis Cedex—France. pp. 1-64.

European Broadcasting Union, ETSI EN 302 304 V1.1.1 (2004-11); European Standard (Telecommunications series), "Digital Video Broadcasting (DVB); Transmission System for Handheld Terminals (DVB-H)," European Telecommunication Standards Institute 2004, 650 Route des Lucioles, F-06921 Sophia Antipolis Cedex—France pp. 1-14.

European Broadcasting Union, ETSI EN 302 307 V1.11 (2006-06); European Standard (Telecommunications series), "Digital Video Broadcasting (DVB); Second generation framing structure, channel coding and modulation systems for Broadcasting, Interactive Services, News Gathering and other broadband satellite applications," European Telecommunication Standards Institute 2006, 650 Route des Lucioles, F-06921 Sophia Antipolis Cedex—France. pp. 1-74.

European Broadcasting Union, ETSI TS 102 006 V1.3.1 (2004-05); Technical Specification, "Digital Video Broadcasting (DVB); Specification for System Software Update in DVB Systems," European Telecommunication Standards Institute 2004, 650 Route des Lucioles, F-06921 Sophia Antipolis Cedex—France. pp. 1-39.

Lee Computer Society, International Standard, ISO/IEC 8802-11, IEEE Std 8U2.11h-2003 (Amendment to IEEE Std 802.11-1999), "Information technology—Telecommunications and information exchange between systems—Local and metropolitan area networks—Specific requirements—; Part 11: Wireless LAN Medium Access Control (MAC) and Physical Layer (PHY) specifications; Amendment 5: Spectrum and Transmit Power Management Extensions in the 5 GHz band in Europe," The Institute of Electrical and Electronics Engineers, Inc., 3 Park Avenue, New York, NY.

International Standard, ISO/IEC 16262, Second edition Jun. 1, 2002, "Information technology—ECMAScript language specification," Reference No. ISO/IEC 16262:2002(E), ISO copyright office, Case postale 56, CH-1211 Geneva 20, Switzerland, pp. 1-179.

International Standard, ISO/IEC 13818-6 First edition Sep. 1, 1998, Amendment 1, Oct. 15, 2000, "Information technology—Generic coding of moving pictures and associated audio information—Part 6: Extensions for DSM-CC; Amendment 1, Additions to support data broadcasting," Reference No. ISO/IEC 13818-6:1998/Amd. 1:2000(E), ISO copyright office, Case postale 56, CH-1211 Geneva 20, Switzerland, pp. 1-8.

International Telecommunication Union, ITU-T, H.264 (May 2003), Telecommunication Standardization Sector of ITU, "Series H: Audiovisual and Multimedia Systems, Infrastructure of audiovisual services—Coding of moving video, Advanced video coding for generic audiovisual services," Geneva, Switzerland, pp. 1-281.

T. Paila, et al., Network Working Group, Request for Comments: 3926, Category: Experimental, "FLUTE—File Delivery over Unidirectional Transport," Oct. 2004, Itamerenkatu 11-13, Helsinki FIN-00180, Finland, pp. 1-33.

* cited by examiner

METHOD OF DISPLAY OF A USER INTERFACE AND CORRESPONDING TRANSMISSION METHOD

This application claims the benefit, under 35 U.S.C. §119 of European Patent Application No. 0854403, filed Jun. 30, 2008.

1. SCOPE OF THE INVENTION

The present invention relates to the domain of service access. More precisely, the invention relates to the display of a user interface enabling access to services.

2. TECHNOLOGICAL BACKGROUND

According to prior art, a device giving access to services displays a user interface that comprises display elements giving access to these services. Such a device is for example a Digital Set Top Box, a mobile receiver, a mobile telephone, etc.

Such a device is connected to a services access network, providing a multitude of services such as the reception of data streams (for example audio or video) in live broadcast or on demand, or the transmission and reception of messages.

Access to these services is obtained via a user interface, provided entirely or in part by one or more servers in the services access network.

The user interface can comprise display elements, such as publicity or news information, a more or less variable list of services and a regularly updated list of services, particularly during weekly promotions of services access.

The user interface is constructed using elements provided by one or more servers, according to information such as user identification, his subscriptions to services, his interests, but also the technical characteristics of the device, such as the display characteristics.

Hence, the loading of elements provided by one or more servers can be relatively long, depending on the interface complexity, the size of the interface elements, the network transmission speed and the occupancy rate of the network and servers. In practice, a user can perceive an interface display delay of a few seconds during the loading of corresponding elements, and the user cannot access the services as long as the interface is not displayed.

Hence the prior art presents the inconvenience of a non-optimized management of the display of a user interface giving access to services.

3. SUMMARY OF THE INVENTION

The purpose of the invention is to overcome the disadvantages of the prior art.

More specifically, the purpose of the invention is to reduce the delay of displaying a user interface giving access to services.

For this purpose, the invention proposes a method of display by a services access device. In order to optimise the display, the method comprises the following steps: a step of display in foreground, of a first user interface generated from display elements stored in the device, the first user interface comprising a first set of display elements giving access to first services, a step of reception of all or part of a second set of display elements giving access to a second set of services, and a display step of a second user interface in foreground, replacing the first user interface and comprising all or part of the second set of display elements.

According to a variant of the display method, the first set of display elements comprises elements giving access to services available in live broadcast.

According to a variant of the display method, the second set of display elements comprises elements giving access to services available on demand.

According to a variant of the display method, the reception step comprises the following steps: a reception step of a third set of display elements giving access to services, and a storage step of the third set of display elements to replace all or part of the first set of display elements.

According to a variant of the display method, the second set of display elements comprises information representative of a storage signal of all or part of the second set of display elements to replace all or part of the first set of display elements.

According to a variant of the display method, the method comprises a multiplexing step of one or more display element sets multiplexed in a data stream.

According to a variant of the display method, the method comprises a step of reception in carrousel form of one or more sets of display elements.

The invention also relates to a method of transmission of a set of display elements giving access to services, that comprises the following steps: a step of transmission to one or more service access devices of a first set of display elements, giving access to services, and a step of transmission to one or more service access devices of a second set of display elements, giving access to services, and destined to be stored.

According to a variant of the transmission method, the second set of display elements comprises elements giving access to services available in live broadcast.

According to a variant of the transmission method, the first set of display elements comprises elements giving access to services available on demand.

According to a variant of the transmission method, the method comprises a multiplexing step of one or more sets of display elements in a data stream.

According to a variant of the transmission method, the method comprises a transmission step of one or more display element sets in carrousel form.

4. LIST OF FIGURES

Figure 2:
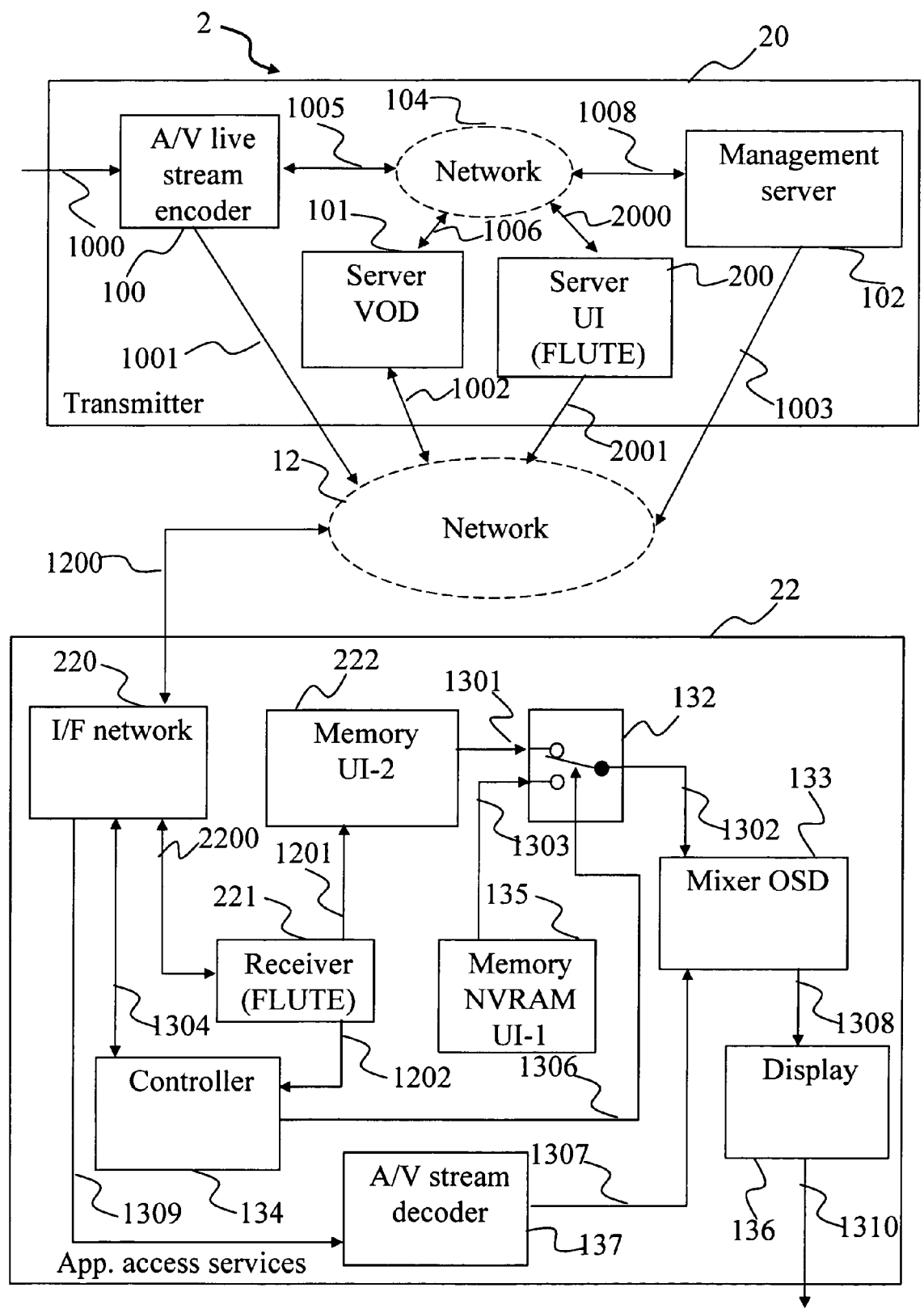
Figure 3:
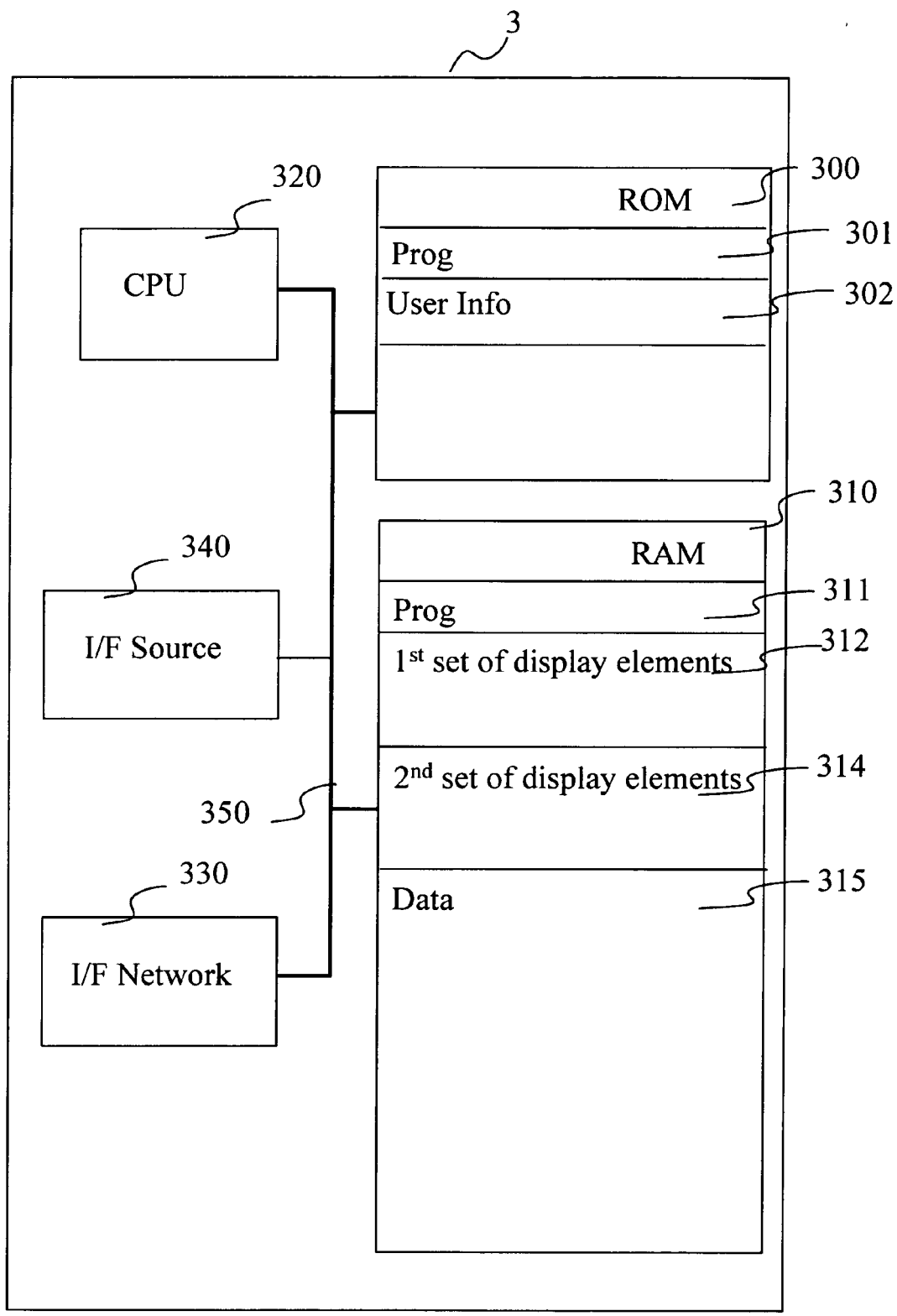
Figure 4:
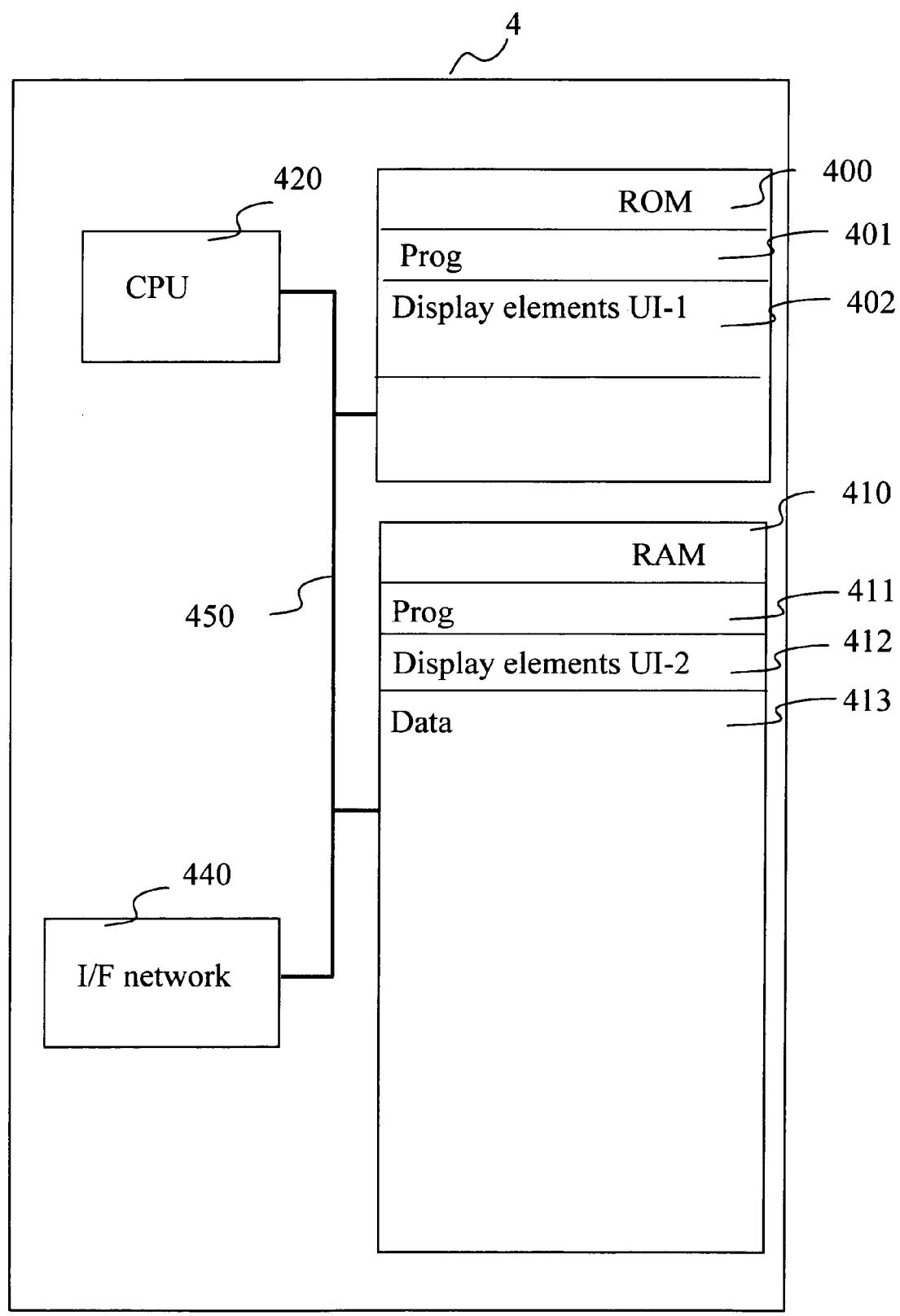
Figure 5:
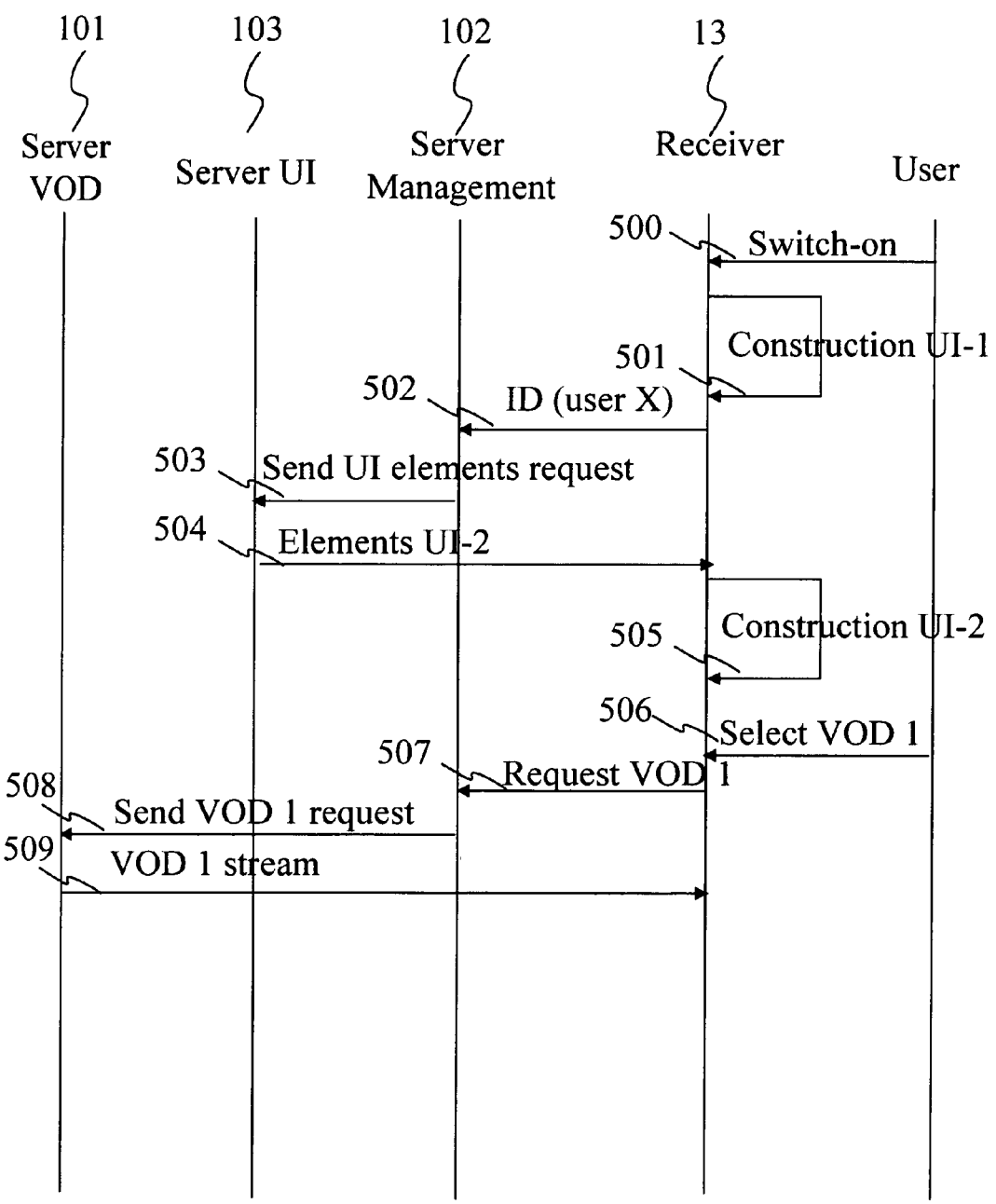
Figure 6:
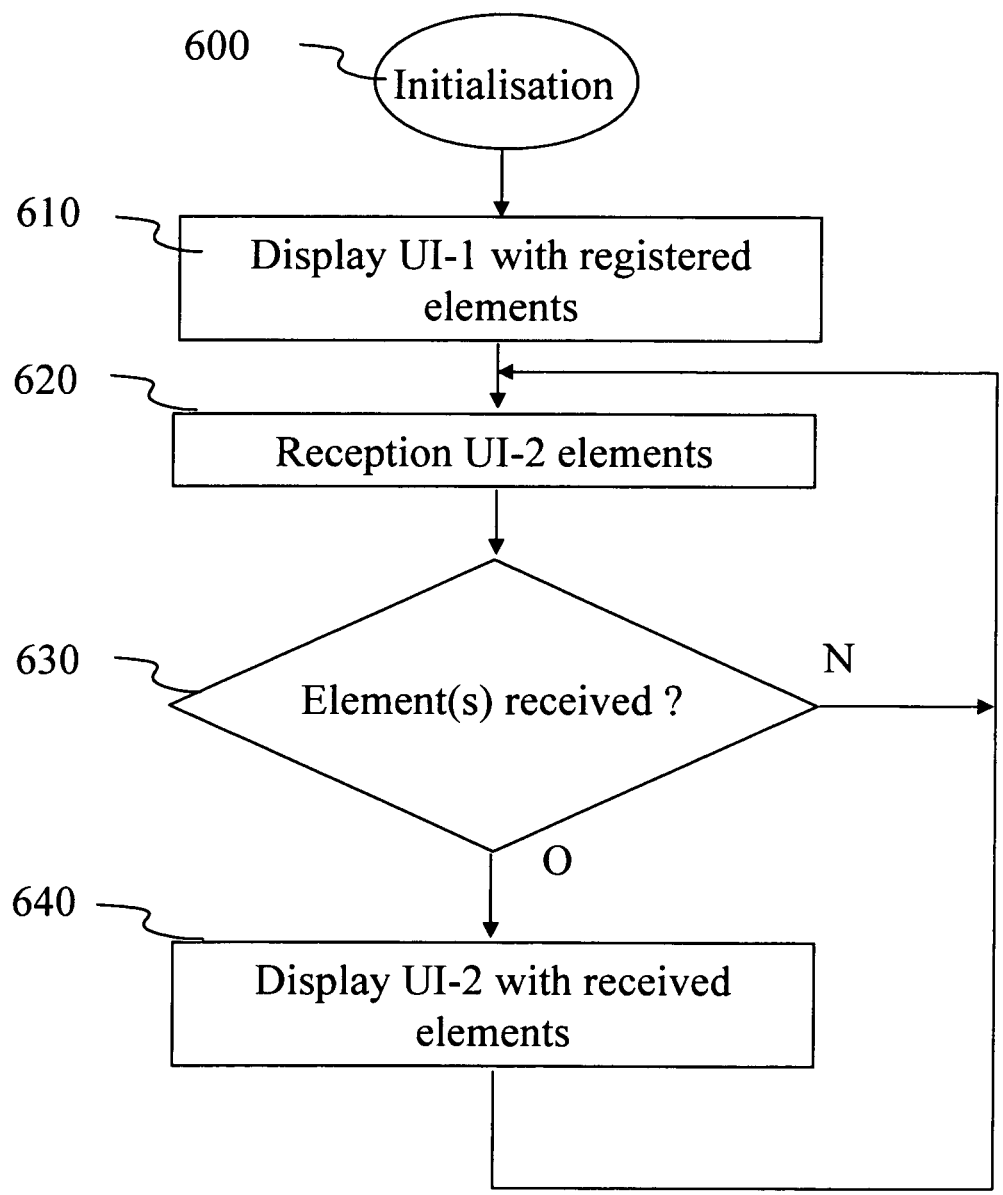
Figure 7:
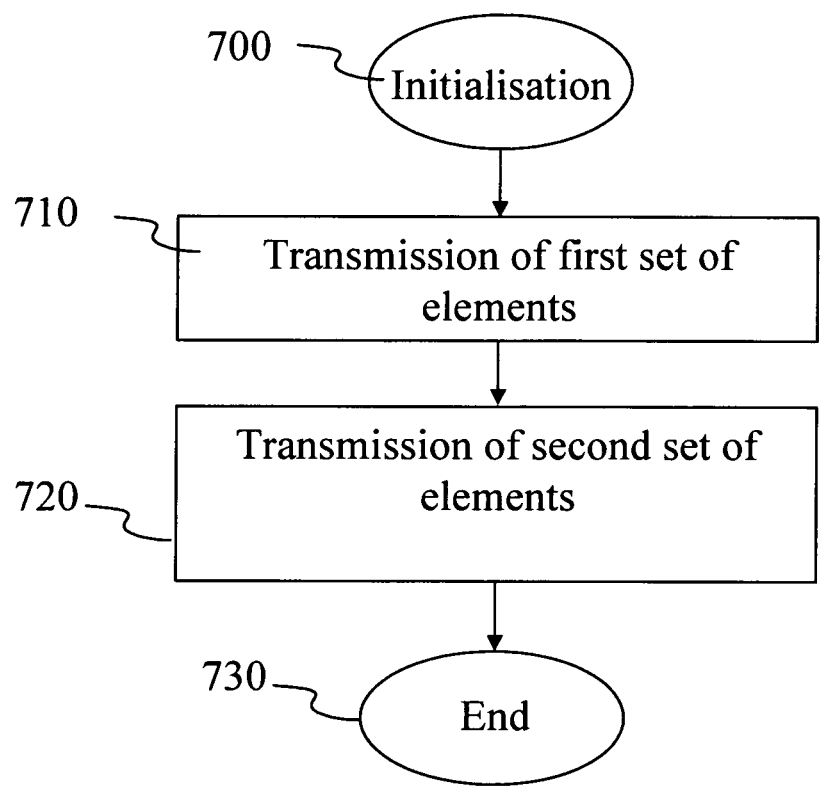
Figure 8:
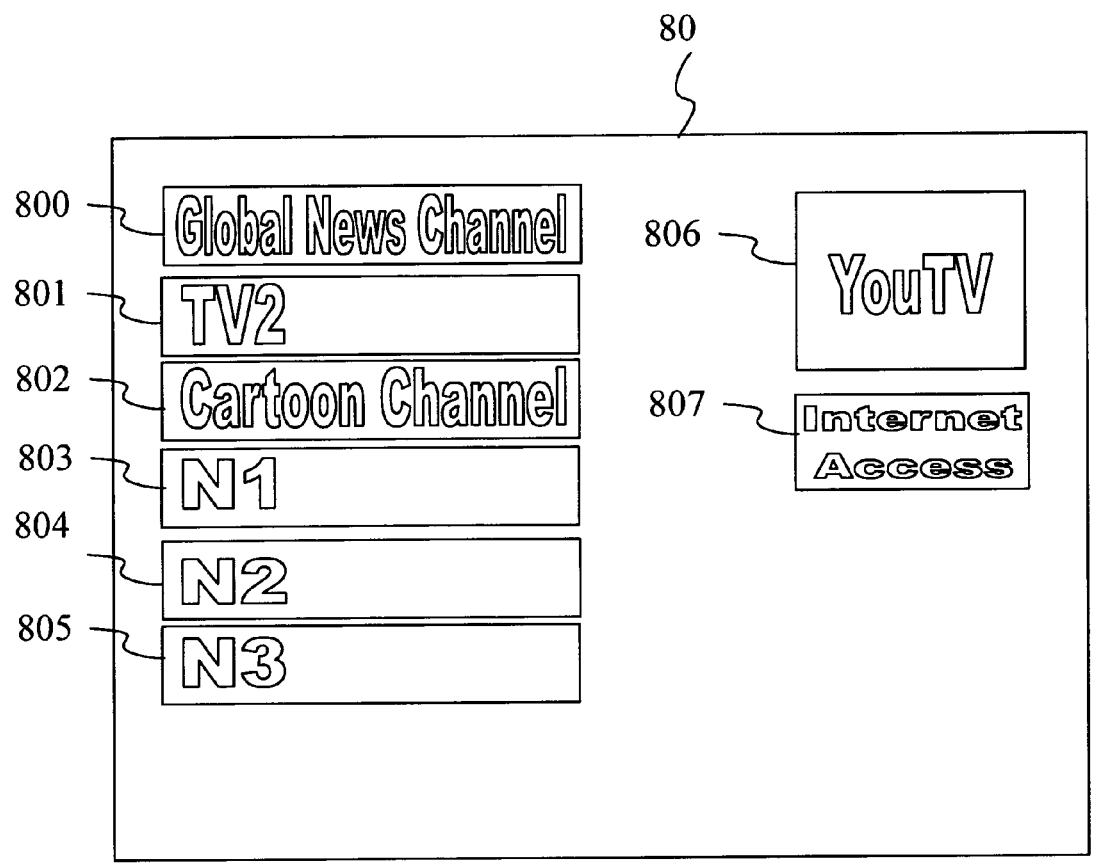
Figure 9:
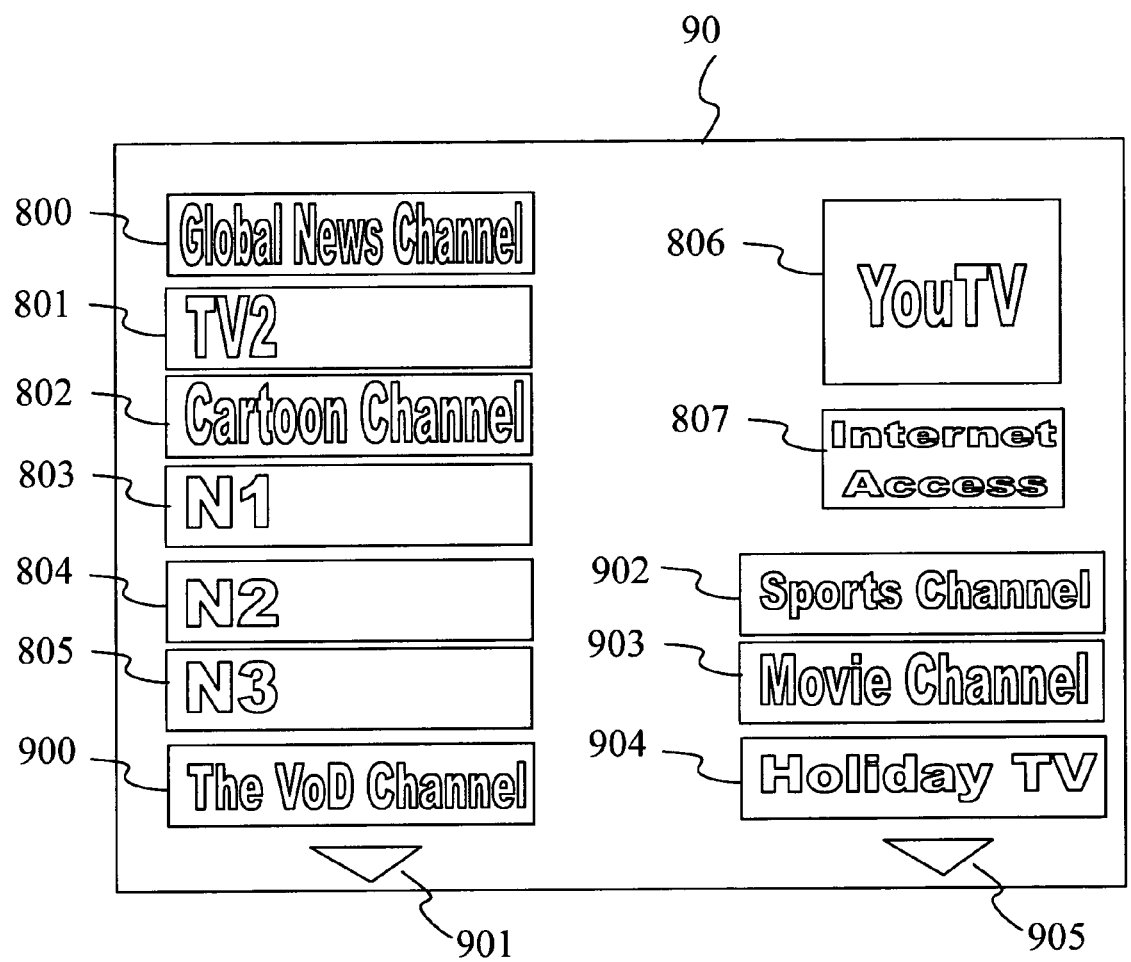

The invention will be better understood, and other specific features and advantages will emerge upon reading the following description, the description making reference to the annexed drawings wherein:

FIGS. 1 and 2 show a schematic block diagram of an infrastructure implementing the invention according to two distinct embodiments, FIG. 3 shows an example of a transmitter according to the invention, belonging to one of the infrastructures shown with respect to FIGS. 1 and 2:

FIG. 4 shows an example of a services access device according to the invention, belonging to one of the infrastructures shown with respect to FIGS. 1 and 2, FIG. 5 shows in the form of a sequence diagram an exchange of messages between devices implementing the invention, FIG. 6 shows a user interface display method according to the invention, FIG. 7 shows a transmission method of a set of display elements according to the invention, and FIGS. 8 and 9 show as an example the first and second user interfaces displayed in the foreground during the implementation of the display method of FIG. 6.

5. DETAILED DESCRIPTION OF THE INVENTION

FIG. 1 presents a block diagram of an infrastructure 1 implementing the invention according to a first embodiment.

The infrastructure comprises:
a transmitter 10,
a services access device 13, and
a network 12.

The transmitter 10 comprises:
an internal network 104,
an encoder 100,
an on demand video server 101 (VoD for Video on Demand),
a management server 102, and
a user interface server 103.

The encoder 100 receives the audio/video data via a source connection 1000 and transmits one or more audio/video data streams encoded on the network 12 via a connection 1001. The on demand video server 101 is linked to the network 12 via a connection 1002. The management server 102 is linked to the network 12 via a connection 1003. The user interface server 103 is linked to the network 12 via a connection 1004. An internal network 104 links the devices comprised in the transmitter 10 together. This network provides the means to management server 102 to exchange information with the devices 100, 101 et 103, and enables the management server 102 to control these devices, in order to ensure the correct operation of the transmitter 10. Hence the encoder 100 is connected to the internal network 104 via the connection 1005, the on demand video server 101 via the connection 1006, the management server 102 via connection 1008, and the user interface server 103 via the connection 1007.

The services access device 13 comprises:
a network interface 130,
a ROM (Read-Only Memory) type memory or NVRAM (Non-Volatile Random Access Memory) for a first user interface "UI-1" 135,
a RAM type memory pour for a second user interface "UI-2" 131,
a switch 132,
a controller 134,
an audio/video decoder 137,
an OSD (On Screen Display) mixer, and
a display 136.

The network interface 130 is connected to the network 12 via a connection 1200. The user interface memory 131 "UI-2" is connected to the network interface 130 via a connection 1300. The memory 131 "UI-2" is connected to the controller 134 via a connection 1305. The controller 134 is connected to the network interface 130 via a bidirectional connection 1304. The memory "UI-1" 135 is connected to the switch 132 via a connection 1306. The switch 132 is connected to the OSD mixer 133 via a connection 1302. The audio/video decoder 137 is connected to the network interface 130 via a connection 1309. The decoder output 1307 is connected to the OSD mixer 133 via a connection 1307. The mixer 133 is connected to the display 136 via a connection 1310. The display output 136 is represented by a connection 1310.

The transmitter 10 receives audio/video data via the connection 1000 in an encoder 100 that compresses the video data to an encoded video stream according to for example the H.264 standard. The compressed stream leaving the encoder 100 is transmitted in the network 12, to the services access device 13. The transmitter 10 also comprises an on demand video server 101, capable of serving on demand video streams to the services access device 13 via the link 1002 that connects it to the network 12. The user interface server 103 provides the display elements to the services access device 13 via the link 1004. A management server 102 of the transmitter 10 manages among other things the information and stream transmission requests from the services access device 13, and is connected to the network 12 via the link 1004.

The network 12 transmits the live video stream(s), the on demand video stream(s), the requests and responses of the services access device 13 to and from the management server 102, as well as the requests and responses to the user interface server 103.

The functioning of the services access device 13 is described hereafter. The controller 134 executes the commands of a device user 13 and pilots the various components. Particularly, when a user starts up the services access device 13, the controller 134 sends a switch command to the switch 132 so as to send to the mixer 133 a first user interface formed from a first set of display elements memorized in the non volatile memory 135 "UI-1". This first interface is transmitted for display on a screen by the display device 136 and the connection 1310. According to a user choice made using the first interface, the controller 134, via the link 1304, implements the reception of data sent by the transmitter 10. The controller 134 also sends a request for transmission of a second set of user interface display elements, that are memorized in the RAM "UI-2" 131 during reception. When the controller 134 establishes that this second user interface is ready to be displayed, the controller 134 receives a signal from the memory 131 via the connection 1305, and causes a switchover 132 via the connection 1306. This action causes the second user interface to be displayed by the components 133 (mixer) and 136 (display) in the foreground, replacing the first user interface.

FIG. 2 shows a block diagram of an infrastructure 1 implementing the invention according to a first embodiment. FIG. 2 comprises the elements that have already been described for FIG. 1, that have a similar function in FIG. 2 and that carry the same references.

The infrastructure comprises:
a transmitter 20,
a services access device 22, and
a network 12.

The transmitter 20 comprises:
an internal network 104,
an encoder 100,
an on demand video server 101,
a management server 102, and
a user interface server 200.

Differing from the user interface server 103 of the transmitter 10, the transmitter 20 of FIG. 2 comprises a user interface server 200 that uses the content distribution protocol FLUTE (File Delivery over Unidirectional Transport), according to the document RFC 3926 entitled "FLUTE— File Delivery over Unidirectional Transport". This user interface server 200 is linked to the internal network 104 via a connection 2000, and to the external network 12 via a connection 2001. The services access device 22 comprises:
a network interface 220,
a FLUTE receiver 221, a ROM type memory or NVRAM for the memorization of a first user interface "UI-1" 222,
a RAM type memory for the memorization of a second user interface "UI-2" 131,
a switch 132,
a controller 134,
a video/audio decoder 137,
an OSD mixer, and
a display 136.

Differing from the services access device 13, the services access device 22 comprises a receiver FLUTE 221. The receiver FLUTE 221 is linked to the network interface 220 via a connection 2200, and connected to memory 222 'UI-2' via a connection 1201, and is connected to the controller 134 via a connection 1202. The memory 222 'UI-2' is connected to the switch 132 via a connection 1301.

Differing from the transmitter 10 of FIG. 1, the transmitter 20 transmits user interface display elements 'UI-2' continuously, in carrousel form, on multicast addresses, according to the file broadcast protocol FLUTE.

Differing from the services access device 13 of FIG. 1, the services access device 22 receives the second set of display elements continuously via multicast addresses in carrousel form according to the FLUTE protocol. The receiver FLUTE 221 memorizes the received set of elements in the memory 222 'UI-2' and sends a signal to the controller 134 via the connection 1202 as soon as a complete set is memorized in this memory.

According to an embodiment variant of the invention, the receiver FLUTE 221 sends a signal to the controller 134 as soon as at least part of a complete set of display elements is received and memorized in the memory 222. Hence the controller 134 is informed as soon as there is reception of at least part of a set of display elements, after which the controller 134 can decide to switch the display from the first interface to the second interface, even if all the elements of the second interface have not yet been received. This enables a rapid switchover of display from the first interface to the second, with a second interface whose display elements are displayed while the missing elements of the second display interface arrive. This variant has the advantage of rapidly proposing a second user interface of the services access device 22, thus reducing the waiting time for the display.

The advantage of this second embodiment of the invention is that the FLUTE protocol is an efficient means for the broadcast of the second set of display elements: broadcasting via multicast leads to relatively little network traffic, the FLUTE protocol enables the transmission and signaling of updates and information transmitted by FLUTE is transmitted in carrousel form, which enables services access devices that have not received a broadcast, for example, services access devices that are in standby, to receive it after quitting the standby state, in another carrousel cycle.

According to an embodiment variant of the invention, the first set of display elements comprises elements providing access to services available in live broadcast, and the second set of display elements comprises elements providing access to services available on demand This has for example the advantage of enabling rapid access, as soon as the services access device is started, to a reduced services offer that varies little, while waiting for the loading of display elements for an interface giving access to a more extended services offer, including services that change more often, for example randomly, regularly or periodically.

According to an embodiment variant of the invention, some display elements comprised in the second set are marked as intended to be recorded by the services access device 13 of FIG. 1 or 22 of FIG. 2 in the memory 135 UI-1, thus enabling the updating of the first user interface with elements of the second interface considered as pertinent until the next update.

According to an embodiment variant of the invention, the transmitter 10 of FIG. 1 or the transmitter 20 of FIG. 2 transmits a third set of display elements, destined to be stored by the services access device in place of the first set of display elements, followed by a storing by the services access device of this third set of elements in replacement of at least part of the first set. This variant has the advantage of enabling the explicit updating of the first user interface, for example useful in the case of modification of a service plan displayed by the first interface, comprising elements giving access to services available in live broadcast, while the second set of display elements comprises display elements providing access to services available on demand.

According to an embodiment variant of the invention, the set or sets of display elements are included in the data stream by multiplexing. This has the advantage, of not requiring a separate path for the broadcast of the display elements set.

According to an embodiment variant of the invention, the display elements broadcast protocol is DSM-CC (Digital Storage Media Command and Control) included in a multiplexed data stream as for example a stream comprising a video service, according to the standard ISO/IEC 13818-6 'Information Technology, Generic coding of moving pictures and associated audio information, Part 6: Extensions for DSM-CC'). This has the advantage, of being a standardized way of broadcasting, understood by a large number of services access devices of various manufacturers.

According to an embodiment variant of the invention, the display elements broadcast protocol is DVB-SSU ('DVB—System Software Updates') according to the document ETSI TS 102 006 entitled 'Digital Video Broadcasting (DVB), Specification for System Software Update in DVB systems'). This has the advantage $^2$of being a way of broadcasting standardized by DVB, and the services access devices that implement this standard are widely spread.

FIG. 3 shows an example of a transmitter 3 according to the invention, corresponding, for example, to transmitter 10 or 20, belonging to the infrastructure illustrated with regard to FIG. 1 or 2. The transmitter 3 comprises, connected together via an addresses and data bus 350:
a CPU 320 (Central Processing Unit),
a non volatile ROM type memory 300,
a RAM memory 310,
a network interface 330 enabling the transmission and reception of packets from a packet switching network, and
a source interface 340 enabling the reception of a data stream to be encoded.

It is noted that the word 'register' used in the description of memories described here designates in each of the memories mentioned with regard to FIGS. 3 and 4, a memory zone of low capacity (some binary data) as well as a memory zone of high capacity (enabling a whole programme to be stored or all or part of the data transmitted or received).

The ROM memory 300 comprises notably:
a programme 'prog' 301, and
information on the proposed service users, such as an identifier, an address, a list of access rights to services subject to subscription, a user profile to target interests of the later, . . . in a register 302.

The algorithms describing the steps of the method described hereafter are stored in the ROM memory 300 associated with the transmitter 3 implementing these steps. On switch-on, the CPU 320 loads and executes the instructions of these algorithms.

The random access memory 310 comprises notably:
- in a register 311, the operating programme of the CPU 320 that is loaded upon switching-on of the transmitter 3,
- a register 312 comprising a first set of display elements,
- a register 314 comprising a second set of display elements,
- a data zone 315 enabling the temporary storage of data required for the correct operation of the transmitter 3.

FIG. 4 presents an example of a services access device 4 according to a particular embodiment of the invention, corresponding, for example, to the services access device 13 or 22, belonging to the infrastructure illustrated with regard to FIG. 1 or 2. The services access device 4 comprises the following elements, connected together by an addresses and data bus 450:
- a CPU 420,
- a ROM type memory 400,
- a RAM memory 410, and
- a network interface 440 enabling transmission and reception of packets from a packet switching network.

The ROM memory 400 comprises notably:
- a programme 'prog' 401, and
- a first set of display elements for a first user interface, in a register 402.

The algorithms implementing the steps of the method described hereafter are stored in the ROM memory 400 associated with the services access device 4 implementing these steps. On being switched-on, the CPU 420 loads and executes the instructions of these algorithms.

The RAM memory 410 comprises notably:
- in a register 411, the CPU operating programme 420 that is loaded upon switching-on of the services access device 4,
- in a register 412, a second set of display elements for a second user interface, and
- a data zone 413 enabling temporary storage of data required for the correct operation of the services access device 4.

Other structures of transmitter or services access device than those described in FIGS. 3 and 4 are compatible with the invention. In particular, according to the variants, the invention is implemented according to a purely hardware embodiment, for example in the form of a decicated component (for example in an ASIC or FPGA or VLSI) (respectively 'Application Specific Integrated Circuit', 'Field-Programmable Gate Array', 'Very Large Scale Integration') or of several electronic components integrated in a device or again in the form of a mixture of hardware and software components.

FIG. 5 presents in the form of a sequence diagram, an exchange of messages between a transmitter 10 and the services access device 13 implementing the invention. The diagram comprises, represented by vertical lines:
- the server VoD 101,
- the server UI 103,
- the management server 102,
- the services access device 13, et
- a user.

The diagram begins with the transmission of a switch-on command to the services access device 13, illustrated by a message 500. Following reception of this command, during a step 501, the services access device 13 quits the standby state and constructs a first user interface UI-1 from a first set of display elements memorized in a non-volatile memory. Next, the services access device 13 sends information representative of user identification to the management server 102, in the form of a message 502. The management server 102 sends a request to send a second set of display elements for a second user interface to the user interface server 103 via a message 503. This UI server responds via a message 504 in which the second set is transmitted to the services access device. On reception of the second set, during a step 505, the services access device 13 constructs a second user interface. The user selects a VoD stream using this second user interface via a command 506, then the services access device sends a request to transmit an on demand video stream to the management server 102 via the message 507. After verification of user rights, the management server 102 transmits the request to the VoD server via request 508, that transmits a stream 509 to the services access device.

FIG. 6 shows a method of user interface display according to the invention, implemented in the services access device 13 or 22.

The display method begins by a step 600 during which different variables required for its correct operation are initialized.

Next, during a step 610, the services access device 13 or 22 displays a first interface UI-1 from a first, stored set of display elements. This step is particularly fast because this first interface is constructed from locally stored display elements.

During a step 620, the services access device 13 or 22 receives at least part of a second set of display elements UI-2.

During a test step 630, the services access device 13 or 22 verifies that at least part of the second set has been received.

If this is the case, during a step 640, part of the second set being received, a second user interface is displayed that replaces the first, and step 620 is reiterated.

If this is not the case, no part of the second set being received, the second user interface is not displayed, and the step 620 is reiterated.

According to an embodiment of the invention, the second user interface is displayed as soon as there is a complete reception of a first display element.

According to an embodiment variant of the invention, the second user interface is displayed upon complete reception of the second set of display elements.

FIG. 7 shows a transmission method of a set of display elements according to the invention, implemented in the transmitter 10 or 20.

The transmission method starts with a step 700 during which different variables required for its correct operation are initialized.

Then, during a step 710, the transmitter 10 or 20 transmits a first set of display elements giving access to services to at least one services access device.

During a step 720, the transmitter 10 or 20 transmits a second set of display elements giving access to services to at least one services access device.

The algorithm ends with a step 730.

According to an advantageous implementation of the invention, the step 710 and 720 are executed in parallel.

FIG. 8 shows as an example a first user interface displayed in the foreground during the implementation of the display method of FIG. 6.

The figure comprises:
- a screen or window 80, and
- display elements 800-807.

The screen or window 80 represents a first user interface generated from display elements stored in a services access device. The elements 800-807 represent display elements of a first set of display elements giving access to first services. For example, the display elements 800-805 represent graphical elements giving access to television or radio services. For example, the display elements 806 and 807 represent graphical elements respectively giving access to an on demand video service via Internet 'YouTV' and an access to an Internet browser application.

FIG. 9 shows as an example a second user interface displayed in the foreground during the implementation of the method of display of FIG. 6. The elements in common with FIG. 8 have the same functioning this figure.

The figure comprises:
a screen or window 90,
display elements 800-807, and
display elements 900-905.

The screen or window 90 represents a second user interface displayed in the foreground, replacing the first interface of FIG. 8 and comprising part of a received second set of display elements, giving access to second services. The display elements 800-807 represent display elements of the first set of display elements. The elements 900-905 represent display elements of the second set of display elements.

Naturally the invention is not limited to the previously described embodiments.

Notably, several steps of the method of display and the method of transmission can be executed in parallel, such as the transmission and reception of data, the display, by adding means of communication and zones of buffer memory between these steps. This notably has the technical advantage of enabling the separation of specific tasks, and an advantage for the user in terms of ease of use and rapidity of the response.

Moreover, the method of display and the method of transmission can be implemented not only by a single device, but by a set of distinct devices.

The architecture of infrastructures 1 and 2 as described in FIGS. 1 and 2 can comprise other devices necessary for operation. For example, several transmitters may be required to supply an enhanced services offer. For example, a management server can manage the transmitter(s) via an internal network LAN (Local Access Network). For example, network equipment such as routers and switches and specific for the transport protocol used may be required to access the network 12. For example, the network 12 is a very high bitrate network commonly called 'backbone', of optical fibres with ATM (Asynchronous Transfer Mode) protocol, enabling a guaranteed very high bitrate. For example, the service access devices are connected to this backbone by distribution centres comprising DSLAM (Digital Subscriber Line Access Multiplexer). For example, a services access device accesses a DSLAM via a telephone line and an ADSL (Asynchronous Digital Subscriber Line) modem. For example, the services access device accesses the network 12 via a gateway device comprising an ADSL modem, a router, a Firewall, a wireless transmitter/receiver, etc, and can connect more than one services access devices at the same time.

A set of services sent by a transmitter can comprise services enabled by that same transmitter, or other transmitters, or even other receivers organized in a P2P (peer to peer) communications network. The services can be made available via one or more operators or service providers. The service type can for example be video, audio, text, images, Internet access, or access to a telephone service.

The network type used can be wired, as shown here, but also wireless, using techniques like WiFi (standard ISO/IEC 8802-11), DVB-H (standard DVB for portable wireless devices, document ETSI EN 302 304: 'DVB Transmission System for Handheld Terminals'), DVB-T (standard DVB for the reception of terrestrial television and radio, document ETSI EN 300 744: 'DVB Framing structure, channel coding and modulation for digital terrestrial television'), or DVB-S (standard DVB for the reception of digital television and radio by satellite, ETSI EN 302 307: 'DVB Second generation framing structure, channel coding and modulation systems for Broadcasting, Interactive Services, News Gathering and other broadband satellite applications') or again according to the standard ATSC (Advanced Television Systems Committee, document 'A/53: ATSC Digital Television Standard, Parts 1-6, 2007').

The display elements can be text, hyperlinks, graphics, and can be organized in one or more pages of graphics, text, documents, or web pages. These elements can be part of a menu, or of a structure of several pages, organized in hierarchical form or not.

The means to update the elements of the first user interface can be:
a FLUTE protocol, as illustrated by the second example of the implementation of the invention,
a JavaScript programme included in a web page, according to the standard ISO/IEC 16262 entitled 'Information Technology—ECMAScript language specification',
a DSM-CC carrousel,
a DVB-SSU carrousel,
any other means or combination of the above described methods, adapted to update a set of display elements in a services access device.

The invention claimed is:

1. A method of displaying a user interface by a services access device connected to a network, said method being implemented by said services access device upon start-up of said services access device, the method comprising:
   starting up said services access device upon receipt of a switch-on command;
   following receipt of said switch-on command, displaying a first user interface, constructed entirely from a locally stored first set of user interface display elements in the services access device giving access to a first set of services transmitted via said network, wherein said first set of user interface display elements comprises elements giving access to services available in live broadcast;
   following the display of said first user interface constructed entirely from the locally stored first set of user interface display elements in the services access device giving access to the first set of services transmitted via said network, transmitting, to said network, a request for reception of a second set of user interface display elements giving access to a second set of services;
   following said transmitting of said request for reception of said second set of user interface display elements, receiving, from said network, at least part of said second set of user interface display elements and constructing a second user interface from said received at least part of the second set of user interface display elements, wherein said second set of user interface display elements comprises elements giving access to services available on demand; and
   following receipt of said at least part of said second set of user interface display elements, switching over to displaying said constructed second user interface when said at least part of said second set of user interface display elements is received, whereby said second user interface replaces said first user interface constructed entirely from the locally stored first set of user interface display elements in the services access device giving access to the first set of services transmitted via said network.

2. The method according to claim 1, wherein the receiving comprises:
receiving a third set of user interface display elements giving access to services; and
storing said third set of user interface display elements to replace at least part of said first set of display elements.

3. The method according to claim 1, wherein said second set of user interface display elements comprises information representative of a storage signal of at least part of said second set of user interface display elements to replace at least part of said first set of user interface display elements.

4. The method according to claim 1, wherein the method further comprises demultiplexing at least one set of user interface display elements multiplexed in a data stream.

5. The method according to claim 1, wherein the method further comprises receiving in carrousel form of at least one set of user interface display elements.

6. A services access device connected to a network, comprising:
a memory;
at least one processor coupled to the memory, the at least one processor being configured to:
transmit for display on a screen, upon start-up of the services access device upon receipt of a switch-on command, a first user interface, constructed entirely from a locally stored first set of user interface display elements in the memory of the services access device giving access to a first set of services transmitted via said network, wherein said first set of user interface display elements comprises elements giving access to services available in live broadcast;
transmit to said network, following said displaying of said first user interface constructed entirely from the locally stored first set of user interface display elements in the memory of the services access device giving access to the first set of services transmitted via said network, a request for reception of a second set of user interface display elements giving access to a second set of services, wherein said first set of user interface display elements comprises elements giving access to services available in live broadcast;
receive from said network, following transmission of said request for reception of said second set of user interface display elements, said second set of user interface display elements and for constructing a second user interface on reception of at least part of the second set of user interface display elements; and
switch, following said reception of at least part of said second set of user interface display elements, over to displaying on said screen said constructed second user interface when said at least part of said second set of user interface display elements is received, whereby said second user interface replaces said first user interface constructed entirely from the locally stored first set of user interface display elements in the memory of the services access device giving access to the first set of services transmitted via said network.

7. The service access device of claim 6, wherein the at least one processor is further configured to:
receive a third set of user interface display elements giving access to services; and
store said third set of user interface display elements to replace at least part of said first set of display elements.

8. The service access device of claim 6, wherein said second set of user interface display elements comprises information representative of a storage signal of at least part of said second set of user interface display elements to replace at least part of said first set of user interface display elements.

9. The service access device of claim 6, wherein the at least one processor is further configured to demultiplex at least one set of user interface display elements multiplexed in a data stream.

10. The service access device of claim 6, wherein the at least one processor is further configured to receive in carrousel form of at least one set of user interface display elements.

11. A services access device comprising:
a first memory configured to store a first user interface;
a second memory configured to store a second user interface;
a hardware controller configured to:
transmit for display on a screen, upon start-up of the services access device upon receipt of a switch-on command, said first user interface constructed entirely from a locally stored first set of user interface display elements in the first memory of the services access device giving access to a first set of services transmitted via a network, wherein said first set of user interface display elements comprises elements giving access to services available in live broadcast;
transmit, following said displaying of said first user interface constructed entirely from the locally stored first set of user interface display elements in the first memory of the services access device giving access to the first set of services transmitted via said network, over the network a request for a second set of user interface display elements giving access to a second set of services, wherein said second set of user interface display elements comprises elements giving access to services available on demand;
construct said second user interface following reception of at least part of the second set of user interface display elements is determined; and
transmit for display on said screen said second user interface such that said second user interface replaces said first user interface constructed entirely from the locally stored first set of user interface display elements in the first memory of the services access device giving access to the first set of services transmitted via said network, the second user interface comprising the received at least part of the second set of user interface display elements storing in the second memory of the services access device.

12. A method of displaying a user interface by a services access device, the method comprising:
transmitting for display on a screen, upon start-up of the services access device upon receipt of a switch-on command, and displaying, using a hardware controller, a first user interface generated entirely from a locally stored first set of user interface display elements in a first memory of the services access device giving access to a first set of services transmitted via a network, wherein said first set of user interface display elements comprises elements giving access to services available in live broadcast;

following the display of said first user interface constructed entirely from the locally stored first set of user interface display elements in the first memory of the services access device giving access to the first set of services transmitted via said network, transmitting, using the hardware controller, a request for a second set of user interface display elements giving access to a second set of services, wherein said second set of user interface display elements comprises elements giving access to services available on demand;

constructing, using the hardware controller, a second user interface following reception of said at least part of the second set of user interface display elements from the network; and following receipt of said at least part of said second set of user interface display elements, displaying, using the hardware controller, said constructed second user interface such that said second user interface replaces said first user interface constructed entirely from the locally stored first set of user interface display elements in the first memory of the services access device giving access to the first set of services transmitted via said network, the second user interface comprising the the received at least part of the second set of user interface display elements storing in a second memory of the services access device.

* * * * *